(12) United States Patent
Farr

(10) Patent No.: US 8,203,814 B2
(45) Date of Patent: Jun. 19, 2012

(54) ELECTRICAL SWITCHING APPARATUS INCLUDING A PLURALITY OF ROGOWSKI COILS AND METHOD OF CALIBRATING THE SAME

(75) Inventor: Lawrence B. Farr, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 498 days.

(21) Appl. No.: 12/550,995

(22) Filed: Aug. 31, 2009

(65) Prior Publication Data

US 2011/0050154 A1 Mar. 3, 2011

(51) Int. Cl.
*H02H 3/00* (2006.01)
*H02H 7/00* (2006.01)

(52) U.S. Cl. ............ 361/63; 318/490; 318/778; 361/23; 361/109; 361/30; 324/113

(58) Field of Classification Search ............ 361/23, 361/109, 30, 63; 700/293, 292; 318/490, 318/778; 324/113
See application file for complete search history.

(56) References Cited

U.S. PATENT DOCUMENTS

| | | | |
|---|---|---|---|
| 7,638,999 B2* | 12/2009 | Kojovic et al. | 324/127 |
| 7,791,353 B2* | 9/2010 | Bellan | 324/529 |
| 8,094,426 B2* | 1/2012 | Kellis et al. | 361/109 |
| 8,116,054 B2* | 2/2012 | Vicente et al. | 361/93.3 |
| 2005/0017699 A1* | 1/2005 | Stanley | 323/282 |
| 2006/0256488 A1* | 11/2006 | Benzing et al. | 361/23 |
| 2008/0158762 A1* | 7/2008 | Lenhart et al. | 361/93.2 |
| 2008/0172192 A1* | 7/2008 | Banhegyesi | 702/61 |
| 2009/0115427 A1 | 5/2009 | Radtke et al. | |
| 2009/0122453 A1* | 5/2009 | Vicente et al. | 361/93.3 |
| 2010/0277199 A1* | 11/2010 | Cusido I Roura et al. | 324/765.01 |
| 2011/0046808 A1* | 2/2011 | Kellis et al. | 700/293 |

* cited by examiner

*Primary Examiner* — Rita Leykin
(74) *Attorney, Agent, or Firm* — Eckert Seamans Cherin & Mellott, LLC; Kirk D. Houser

(57) ABSTRACT

An electrical switching apparatus includes a plurality of poles each having a Rogowski coil and a conductor passing through an opening thereof, and a processor circuit including a sensor circuit including a plurality of inputs each electrically interconnected with an output of the Rogowski coil of a corresponding pole. The sensor circuit further includes a number of outputs having values each corresponding to current flowing through the conductor, a memory including for each corresponding pole an offset value and a gain correction factor for the sensor circuit, and a gain correction factor for the Rogowski coil, a number of routines, and a processor cooperating with the sensor circuit and the routines to provide for each pole a corrected current value as a function of a corresponding one of the values, the sensor circuit offset value and gain correction factor, and the Rogowski coil gain correction factor.

20 Claims, 3 Drawing Sheets

ELECTRICAL SWITCHING APPARATUS INCLUDING A PLURALITY OF ROGOWSKI COILS AND METHOD OF CALIBRATING THE SAME

BACKGROUND

1. Field

The disclosed concept pertains generally to electrical switching apparatus and, more particularly, to such electrical switching apparatus including a plurality of Rogowski coils. The disclosed concept also pertains to methods of calibrating electrical switching apparatus including a plurality of Rogowski coils.

2. Background Information

A Rogowski coil is an electrical device for measuring alternating current (AC) or high speed current pulses. The Rogowski coil consists of a helical coil of wire, wound around a nonmetallic core.

Another type of Rogowski coil includes first and second helical coils of wire (loops) electrically connected in series with each other. The first loop is wound with a substantially constant winding density in a first direction around a core that has a substantially constant cross section. The second loop is wound with a substantially constant winding density in a second direction around a core that has a substantially constant cross section. A conductor (e.g., a power line) whose current is to be measured traverses through the loops. A voltage may be induced in the coil based on the rate of change of the current running through the power line. Rogowski coils may have other configurations as well. See U.S. Pat. Appl. Pub. No. 2009/0115427.

Pat. Appl. Pub. No. 2009/0115427 also discloses that a Rogowski coil may include an air core (or other dielectric core) rather than an iron core, which gives the coil a low inductance and an ability to respond to fast-changing currents. Further, the Rogowski coil typically is highly linear, even when subjected to large currents, such as those of low voltage and medium voltage power lines. By forming the Rogowski coil with equally spaced windings, effects of electromagnetic interference may be substantially avoided.

The voltage that is induced in the Rogowski coil is proportional to the rate of change of current in the conductor. The output of the Rogowski coil is usually connected to an integrator in order to provide an output signal that is proportional to current.

For sensitive ground fault detection applications, two sets of Rogowski coils are electrically connected in series. The first set of Rogowski coils is used for motor protection and the second set of Rogowski coils is used for ground fault protection.

Power systems are grounded to prevent transient overvoltage caused by arcing ground faults. However, if a power system is solidly grounded, then the ground faults can be relatively very high (e.g., without limitation, thousands of amperes) and cause extensive damage to conductors, motors and other loads. Most power systems have adopted a middle ground of using 200 $A_{RMS}$ or 400 $A_{RMS}$ grounding resistors, which are 10 second rated at a 4160 $VAC_{RMS}$ level. This limits the damage and allows ground fault detection systems to be relatively simple and provide positive detection without nuisance tripping.

High resistance ground systems limit the ground current to 10 $A_{RMS}$ to 25 $A_{RMS}$. The purpose of high resistance grounding systems is to limit damage due to ground faults to conductors and motors of the power system while controlling transient overvoltages due to arcing ground faults. Often, users of the power system will only alarm on ground faults and plan an outage of the equipment with the ground fault rather than shutting down the process in the middle of a batch, thereby destroying lots of incomplete product.

Typical medium voltage power systems are grounded to limit collateral damage to equipment due to overvoltage during a ground fault. Most of these systems limit the current flowing in the ground fault for one or more of the following reasons: (1) to reduce the burning and melting effects in faulted electric equipment, such as switchgear, transformers, conductors and rotating machines; (2) to control transient overvoltages while at the same time avoiding the shutdown of a faulty circuit on the first occurrence of a ground fault (e.g., high-resistance grounding); and (3) to limit the damage and allowing less expensive repair often avoiding having to replace the equipment by setting a ground fault relay 2 (FIG. 1A) to trip at ground fault current levels of as low as 5 $A_{RMS}$.

FIG. 1A shows a ground return method, which does not discriminate as to which starter load (not shown) has a fault. This is used as a backup in case a ground fault is not cleared by an individual starter (not shown) or if a ground fault occurs in the power bus or conductor (not shown) upstream of a starter. The ground return method looks at the ground current as it enters the transformer neutral 4 and is used for a power system (not shown) including many different starters and circuit breakers (not shown).

As shown in FIG. 1B, a zero sequence method uses a separate current transformer 6, through which pass all three phases 8,10,12 (e.g., without limitation, motor leads; transformer primaries) and the neutral 4. The corresponding magnetic fields cancel and only the imbalance of current (i.e., the ground current) becomes the secondary current. Such a separate current transformer 6 is relatively large. Since the size of medium voltage starters decreases with each generation as newer technologies remove heat and improve insulation systems, finding space in the starter (not shown) for such a separate current transformer is problematic.

FIG. 1C shows another method of ground fault detection called the differential current or residual method. The secondaries of all of the phase and neutral current transformers 14,16,18,20 are paralleled and the imbalanced current flows in a ground fault relay section 22 of the loop. When using current transformers with magnetic cores, there are errors due to differences in the current transformers such as saturation and winding errors. This can cause a false indication of a ground fault of up to 5% of the corresponding phase currents. When a three-phase motor starts, the current is six to eight times the full load current. Typical starters are designed up to 800 $A_{RMS}$. This means that there can be currents flowing up to 6400 $A_{RMS}$. A 5% error means that this method can give a false indication that a 320 $A_{RMS}$ ground fault is present when none is there. However, it is desirable to set the ground fault relay 22 to trip at ground fault current levels as low as 5 $A_{RMS}$.

There is room for improvement in Rogowski coils.

There is further room for improvement in electrical switching apparatus including Rogowski coils.

SUMMARY

These needs and others are met by aspects of the disclosed concept, which employ a single set of Rogowski coils for both motor protection and ground fault protection, in which such Rogowski coils and corresponding sensor circuits are calibrated to improve system accuracy and allow sensitive high resistance ground fault detection.

In other aspects of the disclosed concept, the Rogowski coils and corresponding sensor circuits are calibrated when manufactured to correct for various gain and offset errors. Calibration of the Rogowski coils and the corresponding sensor circuits can be accomplished, for example, by primary injection of a series of currents common to all of the Rogowski coils and subsequent readings of the corresponding sensor circuits' outputs. From this information, offset and gain correction factors are calculated, which allow the Rogowski coils to be used, for example, for sensitive high resistance ground fault detection.

In accordance with one aspect of the disclosed concept, an electrical switching apparatus comprises: a plurality of poles, each of the poles comprising: a conductor, and a Rogowski coil including an opening and an output, the conductor passing through the opening of the Rogowski coil; and a processor circuit comprising: a sensor circuit including a plurality of inputs, each of the inputs being electrically interconnected with the output of the Rogowski coil of a corresponding one of the poles, the sensor circuit further including a number of outputs having a plurality of values, each of the values corresponding to current flowing through the conductor of a corresponding one of the poles, a memory comprising for each of the poles, an offset value for the sensor circuit for a corresponding one of the poles, a gain correction factor for the sensor circuit for a corresponding one of the poles, and a gain correction factor for the Rogowski coil of a corresponding one of the poles, a number of routines, and a processor cooperating with the sensor circuit and the number of routines to provide for each of the poles a corrected value of the current flowing through the conductor of a corresponding one of the poles as a function of a corresponding one of the values, the offset value for the sensor circuit for the corresponding one of the poles, the gain correction factor for the sensor circuit for the corresponding one of the poles, and the gain correction factor for the Rogowski coil of the corresponding one of the poles.

The plurality of poles may be three poles, and for each of the three poles the processor may be structured to provide the current flowing through the conductor of the corresponding one of the poles from:

$$N_a = N_{ma} - N_{osa}$$

$$K_{csa} = (K_{ADCdesign} \times K_{RCdesign})/(K_{RCCFa} \times K_{CFa})$$

$$A_{amps} = N_a/K_{csa}$$

wherein:
  $N_{ma}$ is the value corresponding to the current flowing through the conductor of the corresponding one of the poles;
  $N_{osa}$ is the offset value for the sensor circuit for the corresponding one of the poles;
  $K_{ADCdesign}$ is desired gain of the sensor circuit for the corresponding one of the poles;
  $K_{RCdesign}$ is desired gain of the Rogowski coil of the corresponding one of the poles;
  $K_{RCCFa}$ is the gain correction factor for the Rogowski coil of the corresponding one of the poles;
  $K_{CFa}$ is the gain correction factor for the sensor circuit for the corresponding one of the poles; and
  $A_{amps}$ is the corrected value of the current flowing through the conductor of the corresponding one of the poles.

As another aspect of the disclosed concept, a method calibrates an electrical switching apparatus comprising for each of a plurality of poles a Rogowski coil and a corresponding sensor circuit, the Rogowski coil including a gain and a gain error, the corresponding sensor circuit including an offset, a gain and a gain error. The method comprises: for each of the poles: determining the offset of the corresponding sensor circuit, determining the gain of the corresponding sensor circuit, determining a gain correction factor for the corresponding sensor circuit, determining the gain of the Rogowski coil by simultaneously passing the same primary current though the Rogowski coil of each of the poles as part of the electrical switching apparatus, and determining a gain correction factor of the Rogowski coil as a function of the determined gain of the Rogowski coil.

The Rogowski coil may further include an offset, and the method may further comprise for each of the poles, determining whether the offset of the Rogowski coil is below a predetermined value.

The method may further comprise as such determining whether the offset of the Rogowski coil is below a predetermined value, closing the electrical switching apparatus, applying a plural-pole line-to-line medium voltage to the electrical switching apparatus, determining whether the offset of the Rogowski coil is greater than or equal to the predetermined value, and responsively rejecting the Rogowski coil.

The method may further comprise displaying at least one of: (a) the gain correction factor of the Rogowski coil with the Rogowski coil; and (b) the gain correction factor of the corresponding sensor circuit with the corresponding sensor circuit.

As another aspect of the disclosed concept, an electrical switching apparatus comprises: a plurality of poles, each pole of the poles comprising: a conductor, and a Rogowski coil including an opening and an output, the conductor passing through the opening of the Rogowski coil; and a processor circuit comprising: a sensor circuit including a plurality of inputs, each of the inputs being electrically interconnected with the output of the Rogowski coil of a corresponding one of the poles, the sensor circuit further including a number of outputs having a plurality of values, each of the values corresponding to current flowing through the conductor of a corresponding one of the poles, a number of routines, and a processor cooperating with the sensor circuit and the number of routines to provide a first protection function for the poles as a function of the current flowing through the conductor of a number of the poles, and to provide a second ground fault protection function as a function of the sum of the plurality of values, wherein the Rogowski coil of each of the poles is used for both of the first protection function and the second ground fault protection function.

The first protection function may be a motor protection function; the second ground fault protection function may be a high resistance ground fault protection function; and the Rogowski coil of each of the poles may be used for both of the motor protection function and the high resistance ground fault protection function.

The second ground fault protection function may be further structured to repetitively sum, for the three poles, the corrected value of the current flowing through the conductor of the corresponding one of the poles for the three poles to determine ground current, to compare the ground current to a predetermined value, and to generate an alarm condition or a trip condition if the ground current exceeds the predetermined value.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "corrected" and variations thereof shall mean altered or adjusted to remove or to substantially remove a number of errors or deviations.

As employed herein, the term "correction factor" and variations thereof shall mean a factor or value employed to remove or substantially remove a number of errors or deviations from another value.

As employed herein, the term "low voltage" shall mean any voltage that is less than about 600 $V_{RMS}$.

As employed herein, the term "medium voltage" shall mean any voltage greater than a low voltage and in the range from about 600 $V_{RMS}$ to about 52 $kV_{RMS}$.

The disclosed concept is described in association with three-phase medium voltage motor starters or three-phase medium voltage motor protectors, although the disclosed concept is applicable to other plural-phase electrical switching or protection apparatus.

Figure 2:
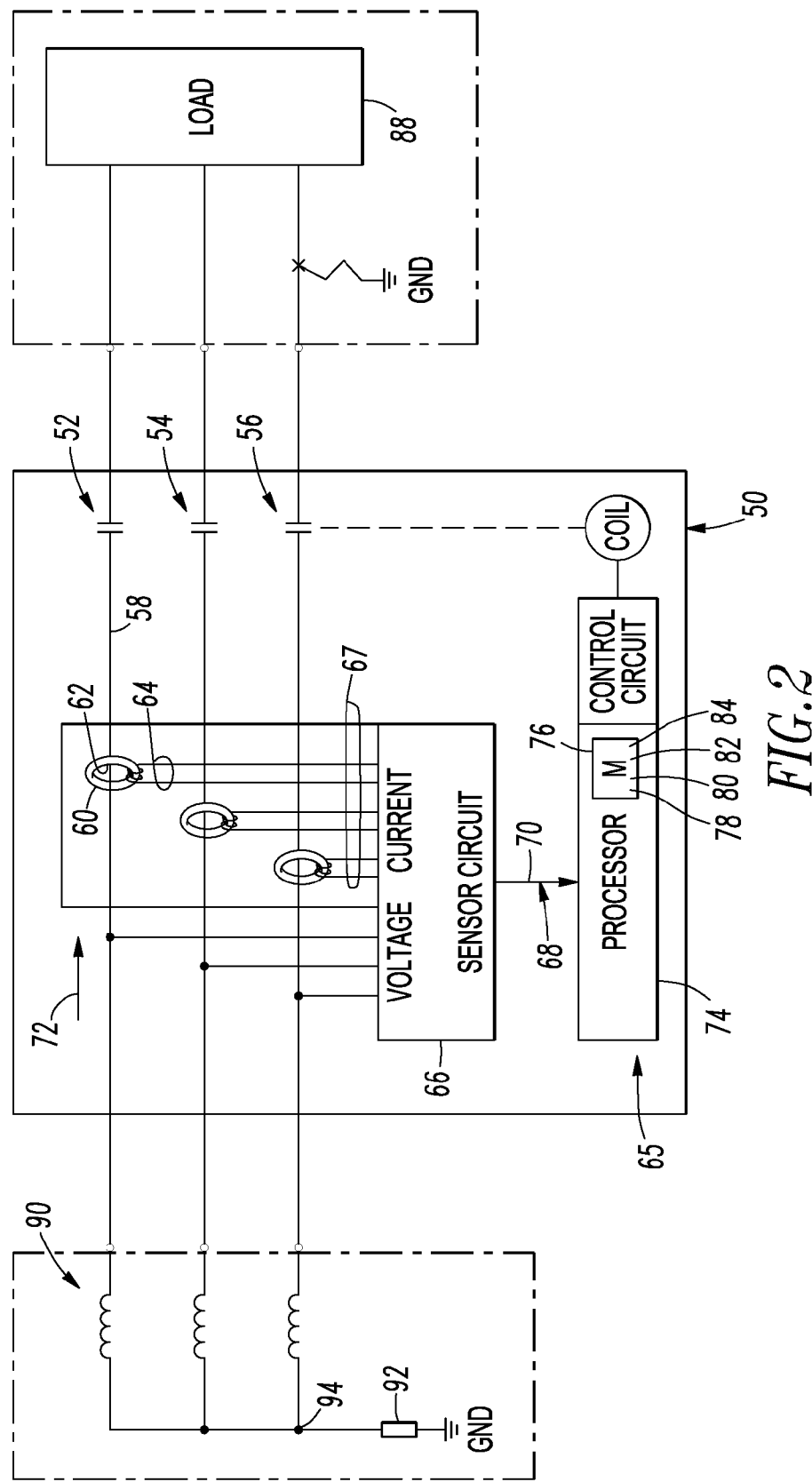
FIG. 2 is a block diagram of a three-phase motor starter in accordance with embodiments of the disclosed concept.

Referring to FIG. 2, an electrical switching apparatus 50 (e.g., without limitation, a motor starter; a medium voltage electrical switching apparatus; a motor protector) includes a plurality of poles (e.g., without limitation, three example poles 52,54,56 are shown). As shown with the first pole 52, each of the poles 52,54,56 includes a conductor 58 and a Rogowski coil 60 including an opening 62 and an output 64. The conductor 58 (e.g., without limitation, an elongated conductor) passes through the opening 62 of the Rogowski coil 60. A processor circuit 65 includes a sensor circuit 66 including a plurality of inputs 67. Each of the inputs 67 is electrically interconnected with the output 64 of the Rogowski coil 60 of a corresponding one of the poles 52,54,56. The sensor circuit 66 further includes a number of outputs 68 having a plurality of values 70 each of which corresponds to current 72 flowing through the conductor 58 of a corresponding one of the poles 52,54,56, as is shown with the pole 52.

The processor circuit 65 also includes a processor 74 and a memory (M) 76, which includes, for each of the poles 52,54,56, an offset value 78 and a gain correction factor 80 for the sensor circuit 66 for a corresponding one of the poles 52,54,56, a gain correction factor 82 for the Rogowski coil 60 of a corresponding one of the poles 52,54,56, and a number of routines 84. The processor 74 cooperates with the sensor circuit 66 and the number of routines 84 to provide for each of the poles 52,54,56 a corrected value 86 of the current 72 flowing through the conductor 58 of a corresponding one of the poles 52,54,56 as a function of a corresponding one of the values 70, the offset value 78 and the gain correction factors 80,82 of the corresponding one of the poles 52,54,56.

Example 1

The three example Rogowski coils 60 and the sensor circuit 66 are fully calibrated to improve system accuracy and allow, for example, sensitive high resistance ground fault detection. The processor 74 of the electrical switching apparatus 50 sums the corrected value 86 of the current 72 for the three example poles 52,54,56 to determine a ground fault current value and compares that value to a predetermined value to determine if a ground fault is present. The Rogowski coils 60 eliminate of the effects of saturation of conventional current transformers and the resulting nonlinearity.

Example 2

The processor 74 can cooperate with the sensor circuit 66 and the number of routines 84 to provide a first protection function (e.g., without limitation, a motor protection function for the load 88 (e.g., without limitation, a three-phase motor)) for the poles 52,54,56 as a function of the current 72 flowing through the conductor 58 of a number of the poles 52,54,56, and to provide a second ground fault protection function (e.g., without limitation, a high impedance ground fault protection function for a power system supplied by a three-phase system transformer 90 and a high resistance grounding resistor 92) as a function of the sum of the plurality of values 70. Here, the single set of Rogowski coils 60 of the three example poles 52,54,56 are advantageously used for both of the first protection function and the second ground fault protection function.

Example 3

An example procedure for calibrating the electrical switching apparatus 50 will now be described. The Rogowski coil 60 includes a gain and a gain error. The corresponding sensor circuit 66 includes an offset, a gain and a gain error. For each of the three example poles 52,54,56, the example procedure determines the offset of the corresponding sensor circuit 66, determines the gain of the corresponding sensor circuit 66, determines the gain correction factor 80 for the corresponding sensor circuit 66, determines the gain of the Rogowski coil 60 by simultaneously passing the same primary current though the Rogowski coil 60 of each of the poles 52,54,56 as part of the electrical switching apparatus 50, and determines the gain correction factor 82 of the Rogowski coil 60 as a function of the determined gain of the Rogowski coil 60.

Example 4

The example calibration procedure includes, for each pole 52,54,56, the primary injection of a series of currents, the subsequent readings of the output 68 of the sensor circuit 66, and the calculation of the sensor circuit offset 78 and the gain correction factors 80,82 for the sensor circuit 66 and the Rogowski coil 60. As will be explained, the Rogowski coils 60 are calibrated when the example three-phase electrical switching apparatus 50 (e.g., without limitation, medium voltage motor starter; medium voltage motor protector) is manufactured and as the Rogowski coils 60 are mounted in the final assembly.

Each sensor circuit 66 channel/Rogowski coil 60 has two gain correction factors 80,82 and one offset 78 that are calibrated. Because the Rogowski coil 60 is linear, a series of calibration points that compensate for the changes in gain based on current levels is not required. Also, as will be explained, if the Rogowski coil 60 is properly shielded, then it has little or no offset.

The purpose of the calibration procedure is to ensure that the gain of each current sensor circuit channel (e.g., without limitation, a suitable sensor circuit, such as an analog to digital converter (e.g., without limitation, an ADC; an ADC channel)) is the same. Because the Rogowski coil 60 and/or the sensor circuit 66 for any of the poles 52,54,56 can be changed in the field, the current sensor circuit channel offset and gain correction factors 80,82 for each of the poles 52,54, 56 are predetermined along with the gain correction factor 82 of the corresponding Rogowski coil 60. For each of the poles 52,54,56, the offset 78 and the two gain correction factors 80,82 are stored in the memory 76 of the processor 74. For example, the gain correction factor 82 of the Rogowski coil 60 can be displayed (e.g., without limitation, printed) on the Rogowski coil 60 for entry into the processor memory 76 in case the Rogowski coil 60 is changed in the field. Similarly, the current sensor circuit channel offset and gain correction factors 78,80 can be displayed (e.g., without limitation, printed) on the sensor circuit 66 for entry into the processor memory 76 in the event that the sensor circuit 66 is changed in the field.

The calibration procedure preferably includes steps to determine: (1) the offset of the sensor circuit 66 (e.g., without limitation ADC; ADC channel) for each pole 52,54,56; (2) the gain of the sensor circuit 66 for each pole in, for example, a suitable count(s) per mV input to the ADC or ADC channel (not shown); (3) the gain correction factor 80 of the sensor circuit 66 for each pole; (4) whether the electrostatic shielding (not shown) of the Rogowski coil 60 is acceptable for each pole; (5) the gain of the Rogowski coil 60 in, for example, mV/A for each pole; and (6) the gain correction factor 82 of the Rogowski coil 60 for each pole.

First, the offset 78 of the sensor circuit 66 for each pole 52,54,56 is measured since, for example, an individual ADC (not shown) has an offset (e.g., offset code in units of counts) based on the variation of its individual components. Although the disclosed concept is discussed in connection with a plurality of ADCs (not shown), one for each pole, it will be appreciated that a single ADC with a plurality of channels (not shown), one channel for each pole can be employed. In that instance, for example, the offset 78 of the sensor circuit channel for each pole is measured. The offset 78 of the sensor circuit 66 can be determined, for example, by putting a resistance (not shown) across the corresponding input 67 of the sensor circuit 66 equal to the expected resistance of the Rogowski coil 60. In turn, the output 68 of the sensor circuit 66 is the desired offset (e.g., $N_{osa}$, $N_{osb}$ and $N_{osc}$ are the offsets for phases a, b and c, respectively). The resistive load for each of the three poles 52,54,56 is preferably the same within about 0.05%. For a zero input, each sensor circuit 66 should report a voltage of zero. The error is the offset 78.

Second, the gain of the sensor circuit 66 for each pole is different based on the variation of the corresponding components. This gain can be measured, for example, by: (1) applying an input (e.g., without limitation, count(s) per mV at 60 Hz) equal to the expected output of the Rogowski coil 60 ±1% at 400 $A_{RMS}$ to all poles 52,54,56 in parallel; (2) subtracting the corresponding offset ($N_{osa}$, $N_{osb}$ and $N_{osc}$ for phases a, b and c, respectively) from each sample (e.g., without limitation, 4000 samples per second) of the output 68 of the sensor circuit 66 for the various poles 52,54,56; (3) calculating the RMS value of the resulting ADC output code from the samples for each of the poles; and (4) dividing the resulting RMS value by the input mV to the sensor circuit 66 to determine the gain of the sensor circuit (count(s)/mV) for each of the poles.

This second step is shown by Equations 1, 2 and 3, below. It will be appreciated that Equations 2 and 3 can readily be employed for phases b and c.

$$N_a = (N_{ma} - N_{osa})$$

$$N_b = (N_{mb} - N_{osb})$$

$$N_c = (N_{mc} - N_{osc}) \quad \text{(Eq. 1)}$$

$$N_{RMSa} = (((N_{a1})^2 + (N_{a2})^2 + \ldots + (N_{an})^2)/n)^{0.5} \quad \text{(Eq. 2)}$$

$$K_{ADCa} = N_{RMSa}/mV_{in} \quad \text{(Eq. 3)}$$

wherein:
$N_a$, $N_b$ and $N_c$ are the outputs of the sensor circuits for phases a, b and c, respectively, corrected for the corresponding offset;
$N_{ma}$, $N_{mb}$ and $N_{mc}$ are the outputs of the sensor circuits for phases a, b and c, respectively, with the same input voltage mV;
$N_{RMSa}$ is the RMS value of n samples for the phase a sensor circuit;
$N_{RMSb}$ is the RMS value of n samples for the phase b sensor circuit;
$N_{RMSc}$ is the RMS value of n samples for the phase c sensor circuit;
$N_{a1}$ is the first sample for the phase a sensor circuit;
$N_{a2}$ is the second sample for the phase a sensor circuit;
$N_{an}$ is the $n^{th}$ sample for the phase a sensor circuit;
n is the number of samples;
$K_{ADCa}$ is the gain (count(s)/mV) of the sensor circuit for phase a;
$K_{ADCb}$ is the gain of the sensor circuit for phase b;
$K_{ADCc}$ is the gain of the sensor circuit for phase c; and
$mV_{in}$ is the input to the sensor circuits in mV.

Third, the gain correction factor 80 of the sensor circuit 66 for the various poles 52,54,56 is determined. Since the gain is different for each sensor circuit 66 channel based on individual component variations, a corresponding gain correction factor is determined for each pole to make the sensor circuit gain be effectively the same for each pole. The gain correction factor 80 is established by: (1) calculating the gain correction factor using Equation 4 (it will be appreciated that Equation 4 can readily be employed for phases b and c); and (2) storing the gain correction factor 80 and the offset 78 for each pole in the processor memory 76.

$$K_{CFa} = K_{ADCdesign}/K_{ADCa} \quad \text{(Eq. 4)}$$

wherein:
$K_{ADCdesign}$ is the desired gain (count(s)/mV) for the sensor circuit;
$K_{CFa}$ is the sensor circuit gain correction factor (a ratio) for phase a;
$K_{CFb}$ is the sensor circuit gain correction factor for phase b; and
$K_{CFc}$ is the sensor circuit gain correction factor for phase c.

Fourth, it is determined whether the electrostatic shielding (not shown) of the Rogowski coil 60 is acceptable for each pole 52,54,56. For example, a Rogowski coil, if properly shielded, has little or no offset. On the other hand, if the Rogowski coil is left unshielded from a medium voltage (e.g., without limitation, 4160 $VAC_{RMS}$ at 3 inches from the Rogowski coil), then the corresponding electric fields can cause an alternating current (AC) offset equal to an equivalent of about 10 $A_{RMS}$ to 30 $A_{RMS}$. The VAC acceptability of the electrostatic shielding can be determined, for example and without limitation, by closing the electrical switching apparatus 50, applying a suitable voltage (e.g., without limitation, 4160 $VAC_{RMS}$, three-phase line-to-line and 2400 $VAC_{RMS}$ to ground) to the electrical switching apparatus 50 with the Rogowski coil 60 mounted therein, and if there is an offset greater than or equal to 2 $A_{RMS}$, then the Rogowski coil is rejected.

Fifth, the gain of the Rogowski coil 60 for each of the poles 52,54,56 is determined. Since the gain of each Rogowski coil 60 can be somewhat different, this can be measured and corrected by the processor 74. For example, the gain of each Rogowski coil 60 can be determined by: (1) passing the same (e.g., without limitation, 400 $A_{RMS}$), single phase current (I), through each Rogowski coil 60 after it is mounted with respect to the electrical switching apparatus 50; and (2) the resulting output 68 of the sensor circuit 66 for each pole is used to calculate the gain of the corresponding Rogowski coil 60 according to Equation 5 (it will be appreciated that Equation 5 can readily be employed for phases b and c).

$$K_{RCa} = (N_{ma}/(K_{ADCa} * K_{CFa}))/Ia \quad \text{(Eq. 5)}$$

wherein:
$K_{RCa}$ is gain of the Rogowski coil (mV/A) of phase a;
$K_{RCb}$ is gain of the Rogowski coil of phase b;
$K_{RCc}$ is gain of the Rogowski coil of phase c;
$N_{ma}$ is the output (count(s)) of the sensor circuit for phase a;
$K_{ADCa}$ is the gain (count(s)/mV) of the sensor circuit for phase a from Equation 3, above;
$K_{CFa}$ is the sensor circuit gain correction factor (a ratio) for phase a; and
Ia is the current in phase a.

Sixth and finally, the gain correction factor 82 for the Rogowski coil 60 of each of the various poles 52,54,56 is established by: (1) calculating the gain correction factor 82 for the Rogowski coil 60 for each pole 52,54,56 using Equation 6 (it will be appreciated that Equation 6 can readily be employed for phases b and c); (2) multiplying the Rogowski coil gain for each pole by its corresponding gain correction factor 82 such that all of the corrected gains are equal; (3) storing the gain correction factor 82 for the Rogowski coil 60 of each pole in the processor memory 76; and (4) applying a label (not shown) to the Rogowski coil 60 with the corresponding gain correction factor 82. In case of field changes to the Rogowski coil 60 and/or the sensor circuit 66, the gain correction factor 82 of the Rogowski coil 60 is preferably displayed (e.g., without limitation, printed) with the Rogowski coil 60 and the gain correction factor 80 and offset 78 of the corresponding sensor circuit 66 are preferably displayed (e.g., without limitation, printed) with the corresponding sensor circuit 66.

$$K_{RCCFa} = K_{RCdesign}/K_{RCa} \quad \text{(Eq. 6)}$$

wherein:
$K_{RCdesign}$ is the desired gain of the Rogowski coil (mV/A);
$K_{RCa}$ is gain of the Rogowski coil (mV/A) for phase a;
$K_{RCCFa}$ is the sensor circuit gain correction factor (a ratio) for Rogowski coil gain for phase a;
$K_{RCCFb}$ is the sensor circuit gain correction factor for Rogowski coil gain for phase b; and
$K_{RCCFc}$ is the sensor circuit gain correction factor for Rogowski coil gain for phase c.

Example 5

When used in medium voltage applications, Rogowski coils are subject to electrostatic interference due to their relatively close proximity to medium voltage conductors.

Some known Rogowski coils employ a copper foil (not shown) inside a non-conductive case in order to seek to isolate the internal coil from electrostatic interference. It is known to ground the copper foil of a Rogowski coil. Alternatively, it is known to employ a complex plastic copper-coated electrostatic shield (not shown) for the Rogowski coil.

Another approach is to employ a Rogowski coil (not shown) including a core, a Rogowski coil winding (e.g., an insulated conductor) disposed on the core, an insulator (e.g., without limitation, layer insulation, such as Kapton® tape; any suitable flexible insulating tape that conforms to the curve of the core; an insulator structured to provide mechanical protection for the winding during subsequent assembly operations) disposed on the Rogowski coil winding disposed on the core, and an outer conductive winding disposed on the insulator disposed on the Rogowski coil winding disposed on the core. Layer insulation is not required, but by having it, the other conductive winding will lay down smoother thereby reducing the number and size of gaps in the outer conductive layer. Alternatively, or in addition, the Rogowski coil winding is an insulated conductor. The Rogowski coil winding, the insulator and the conductive winding are preferably disposed over and around the core. Preferably, a suitable outer protective insulation layer (e.g., without limitation, Kapton® tape) is disposed on the conductive winding over and around the core. The conductive winding includes an electrical connection (e.g., without limitation, one end of the conductive winding) structured to be grounded. The Rogowski coil winding also includes an output (e.g., without limitation, opposite ends or leads of the Rogowski coil winding). When the conductive winding is grounded, the grounded conductive winding provides electrostatic shielding for the Rogowski coil winding of the Rogowski coil. Preferably, the conductive winding is wound "shoulder-to-shoulder" (e.g., a winding where each winding turn of a conductor, such as a wire, on the outside of a Rogowski coil core, on a Rogowski coil winding or on the insulator for the Rogowski coil winding, is against at least another such winding turn with no or relatively very little gap (e.g., less than or equal to about one-half of the wire diameter) therebetween) on the Rogowski coil winding and is grounded at one end or lead of the conductive winding to provide isolation. The conductive winding is electrically insulated from the Rogowski coil winding by the insulator (or, for example and without limitation, by another suitable insulator; by insulation of an insulated conductive winding; by insulation of the Rogowski coil winding). Hence, the outer grounded conductive winding provides an electrostatic shield for the Rogowski coil winding. See, for example, U.S. patent application Ser. No. 12/544,496.

Example 6

The detection of a ground fault can be accomplished by taking the value 70 (ADC output code) output from each of the sensor circuit 66 channels and correcting it for sensor circuit offset and gain and for Rogowski coil gain, before adding them. The result is a ground fault count that is in RMS after using a suitable multiplier to provide the RMS ground current flowing. During operation, the sensor circuit 66 provides current values 70 for the three poles 52,54,56, which are corrected for offset, as shown in Equation 7.

$$N_a = N_{ma} - N_{osa} \quad (Eq. 7)$$

wherein:
Na is the output of the phase a sensor circuit as corrected for offset;
Nb is the output of the phase b sensor circuit as corrected for offset;
Nc is the output of the phase c sensor circuit as corrected for offset;
$N_{ma}$ is the output of the phase a sensor circuit; and
$N_{osa}$ is the offset of the phase a sensor circuit.

Next, the gains (count(s)/A) are determined for the sensor circuit 66 channels as is shown, below, in Equation 8 (it will be appreciated that Equation 8 can readily be employed for phases b and c) for phase a.

$$K_{csa} = (K_{ADCdesign} \times K_{RCdesign})/(K_{RCCFa} \times K_{CFa}) \quad (Eq. 8)$$

wherein:
$K_{csa}$ is gain (count(s)/A) of the sensor circuit for phase a;
$K_{csb}$ is gain of the sensor circuit for phase b;
$K_{csc}$ is gain of the sensor circuit for phase c;
$K_{ADCdesign}$ is the desired gain (count(s)/mV) of the sensor circuit;
$K_{RCdesign}$ is the desired gain (mV/A) of the Rogowski coil;
$K_{RCCFa}$ is the Rogowski coil gain correction factor (a ratio) for phase a; and
$K_{CFa}$ is the sensor circuit gain correction factor (a ratio) for phase a.

Equation 9 (it will be appreciated that Equation 9 can readily be employed for phases b and c) shows the calculation of the current number for phase a, where the offset-corrected count from the raw current sensor count is divided by the sensor circuit gain.

$$A_{amps} = N_a / K_{csa} \quad (Eq. 9)$$

wherein:
$A_{amps}$ is current (A) in phase a;
$B_{amps}$ is current in phase b; and
$C_{amps}$ is current in phase c.

In turn, the currents in phases a, b and c are periodically added (e.g., without limitation, 4000 times a second; any suitable time period) and the resulting count is the instantaneous ground current. The instantaneous ground current count is then run into a suitable RMS calculator routine and the output thereof is used to meter, alarm and/or trip on a ground fault (e.g., without limitation, depending on the state of the motor starter (e.g., starting; running)

Example 7

The second ground fault protection function of the number of routines 84 can repetitively sum, for the three poles 52,54, 56, the corrected value 86 of the current 72 flowing through the conductor 58 of the corresponding one of the poles 52,54, 56 for each of the poles to determine ground current, to compare the ground current to a predetermined value, and to generate an alarm condition or a trip condition if the ground current exceeds the predetermined value.

For example, if the electrical switching apparatus 50 is a three-pole motor starter, as shown in FIG. 2, each motor lead, whose current is to be measured, is passed through a corresponding Rogowski coil 60. Since the voltage, which is in the mV/A range, that is induced in the Rogowski coil 60 is proportional to the rate of change (derivative) of current in the motor lead, the output 64 of the Rogowski coil 60 is suitably integrated in order to provide an output signal that is proportional to current. The Rogowski coil 60 has a linear input to output gain that extends well beyond its normal operating range. This is because the Rogowski coil 60 is wound on a core that has no magnetic material. Magnetic core materials saturate differently even when made from the same batch of processed material. However, each Rogowski coil 60 is wound somewhat differently so that there are small differences in the output 64. Although the error is small (e.g., usually less than 1%), the ground currents being measured are less than 0.5% of full load motor current.

Each Rogowski coil 60 and its associated sensor circuit 66 channel is preferably calibrated for gain and offset to less than 0.05% of 1000 $A_{RMS}$ or a 0.5 $A_{RMS}$ error between two different Rogowski coils/sensor circuits channels.

Example 8

Figure 1A:
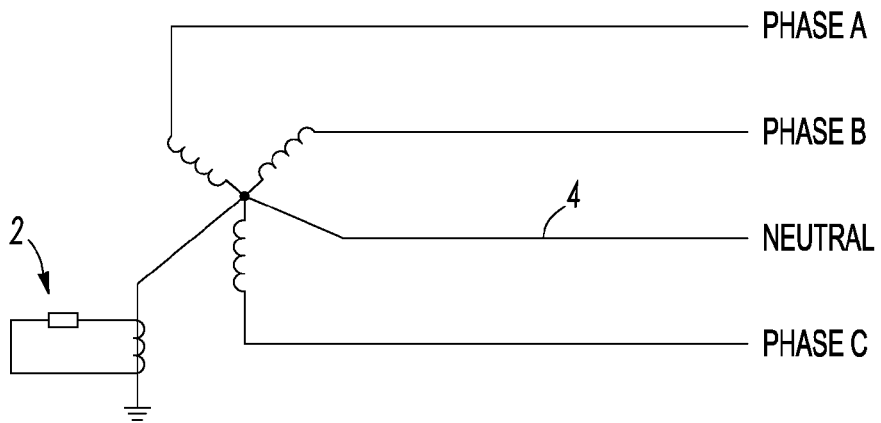
FIG. 1A is a block diagram of a three-phase system including a conventional ground fault relay.
Figure 1B:
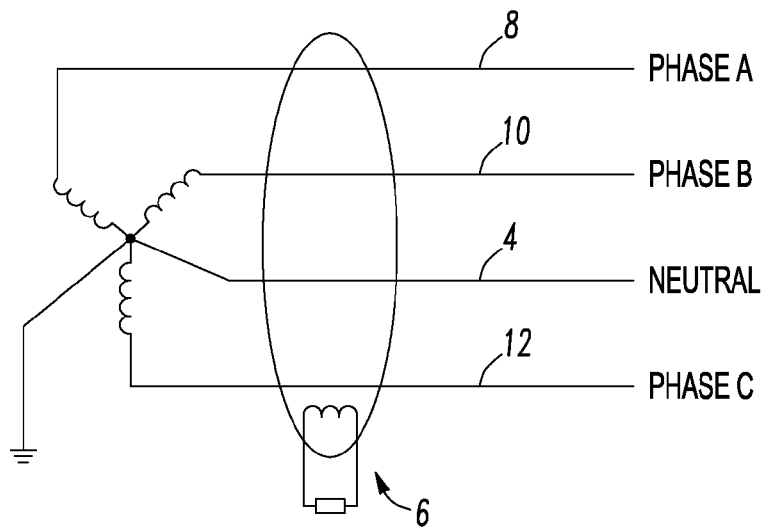
FIG. 1B is a block diagram of a three-phase system including a separate current transformer, through which pass all three phases, and a zero sequence ground fault relay.
Figure 1C:
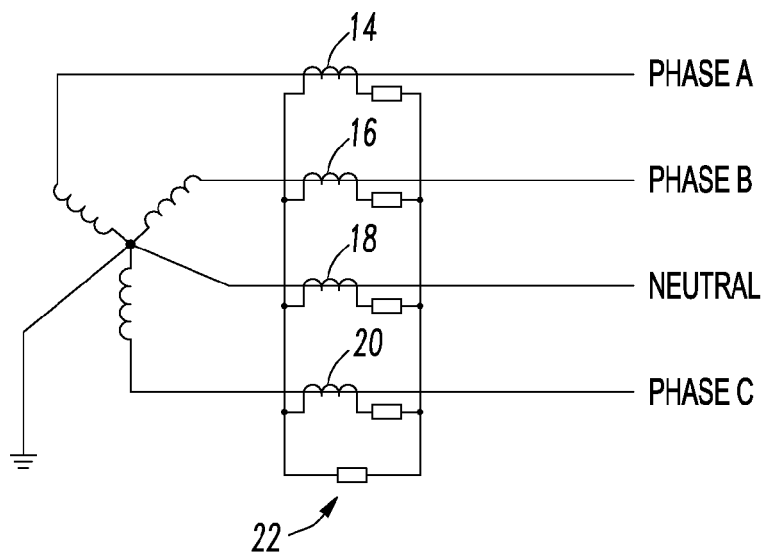
FIG. 1C is a block diagram of a differential current three-phase system in which the secondaries of three-phase current transformers are paralleled and the imbalanced current flows in a ground fault relay section.
Figure 3:
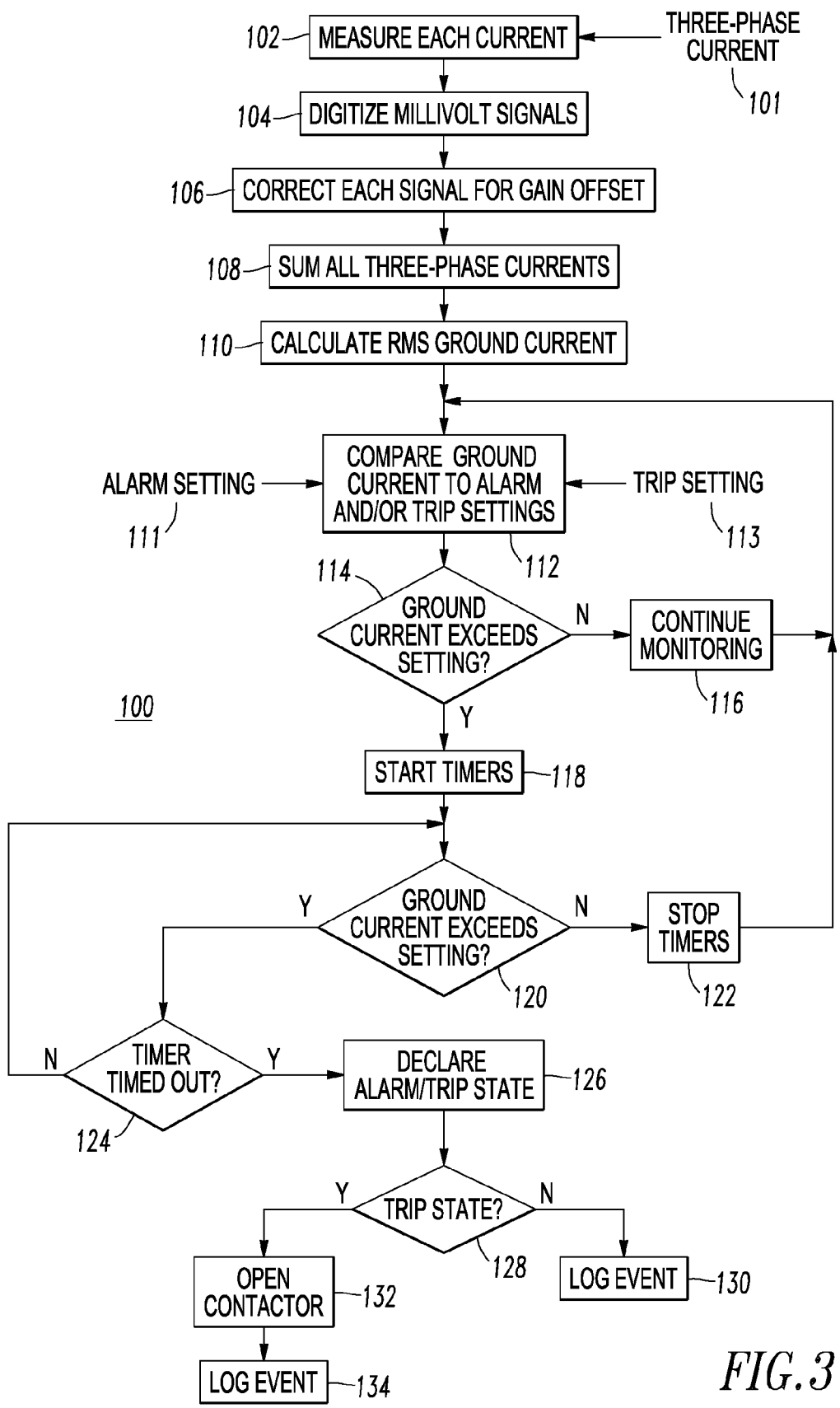
FIG. 3 is a flow chart of a ground fault routine of the processor of FIG. 2.

Referring to FIG. 3, an example ground fault protection routine 100 is shown, which is one of the number of routines 84 of FIG. 1. First, at 102, the routine 100 measures each of three-phase currents 101 from the corresponding Rogowski coils 60 and sensor circuit 66 channel. Next, at 104, each Rogowski coil mV phase current output is digitized, for example and without limitation, 4000 times per second. Then, at 106, each digitized sample is corrected for gain and offset using, for example, Equations 7-9, above.

When current passes through the Rogowski coil 60, it generates a mV/A signal. The Rogowski coil output 64 is input by the sensor circuit 66, which converts the mV signal into the digital value 70. This measured current value does not truly reflect the current passing through the Rogowski coil 60, much less the input signal to the sensor circuit 66. To correct this value 70 to truly represent the current passing through the Rogowski coil 60, adjustments are made for errors. The first error is when there is no current flowing through the Rogowski coil 60 and the sensor circuit 66 reports a value that is not zero. This is the offset of the sensor circuit 66. The measured current value is adjusted by subtracting the sensor circuit offset 78 in order that the corrected measured current value is zero when there is no current passing through the Rogowski coil 60. The second error is one of gain. Due to variances in winding the Rogowski coils 60, in manufacturing the resistors (not shown) and other components in the sensor circuit 66, errors are introduced. The gain in each channel of the sensor circuit 66 is different even though it is relatively small. In other words, the measured current value less the offset divided by the actual current passing through the Rogowski coil 60 is different. Each pole's correction factor is divided into each pole's measured current value, in order that the resulting value is the same for all three poles 52,54,56 when the same current is passing through each pole's Rogowski coil 60. In other words, each Rogowski coil's output 64 is adjusted for an error in gain and the corresponding channel of the sensor circuit 66 is adjusted for errors in offset and gain to reflect the true current passing through the Rogowski coil 60.

Next, at 108, the three-pole corrected samples are summed, for example and without limitation, 4000 times per second. This sum is the ground current. In a three-phase circuit, the sum of the currents is zero if there is no ground current. Then, at 110, the RMS ground current is calculated from the sum. In a three-pole circuit, without a neutral, the instantaneous value of all three currents is zero. In other words, what current flows to the load 88 in one pole returns to the source in the other two poles. When there is a ground current, some current returns to the transformer neutral 94 and the high resistance grounding resistor 92 (FIG. 2) through the motor case (not shown) and ground conductors (not shown) instead of through the other two poles. When the instantaneous values of all three-phase currents are summed, the remainder is what did not pass through the Rogowski coils 60 and, therefore, is counted as ground current.

For example, when the current samples are summed and there is a residual, the sum is hardly ever exactly zero due to imbalance in cable capacitance charging currents and insulation leakage. The value is squared, multiplied by itself and put into a filter. At the same time, the oldest sample is removed. The filter then sums the results and divides the sum by the number of samples (e.g., without limitation, 16), and then takes the square root of the mean of the squared ground current.

Preferably, an integrator (not shown) for the di/dt output 64 of the Rogowski coil 60 is part of the number of routines 84 of the processor 74. Alternatively, a suitable hardware integrator (not shown) can be employed.

Then, at 112, the RMS ground current value is compared to an alarm value 111 and a trip value 113. An alarm condition and/or a trip condition are declared if the ground current value exceeds the alarm value 111 and/or the trip value 113. For example and without limitation, the RMS ground current value is compared to the alarm value 111 (e.g., without limitation, about 5 $A_{RMS}$ to about 8 $A_{RMS}$) and to the trip value 113 (e.g., without limitation, about 5 $A_{RMS}$ to about 12 $A_{RMS}$). When the RMS value of ground current exceeds one or both of the values 111,113, it starts a timer (not shown) that has two settings for alarm and two settings for trip. Two delays are employed: (1) a start delay; and (2) a run delay. For example, starting cable and motor winding capacitance (not shown) looks like a ground fault until charged and a surge capacitor (not shown) adds a level of error. For example, the run delay is used to ignore the effects of lighting surges. The first settings are active during the start sequence. Here, the charging of the capacitance in the insulation of the motor, conductors and surge capacitors appears as a ground current. As a result, the start delay timer is set relatively longer to about 5 to 10 cycles. The second settings are active during the run state. Here, the charging of the above mentioned capacitance is complete, but surges due to short circuits on conductors elsewhere in the system or lightning impulses on the power line can appear as ground currents as they flow through the capacitance. The run delay timer is set relatively shorter to about 3 to 8 cycles. The alarm and trip values 111,113 and associated delays are set as low as possible to limit damage, but at the same time high and long enough to limit the number of nuisance alarms and trips.

At 114, if the ground current does not exceed the alarm and trip values 111,113, then monitoring continues at 116 followed by 112. Otherwise, the alarm condition and/or the trip condition are declared and a number of corresponding timers (not shown) are started at 118. These timers ensure that a sporadic ground current of less than a predetermined time does not cause an alarm or trip.

Next, at 120, if the ground current does not exceed the alarm and trip values 111,113, then the timers are stopped at 122 and monitoring continues at 112. Otherwise, at 124, it is determined if the corresponding timer(s) have timed out. If not, then step 120 is repeated. Otherwise, at 126, an alarm state and/or trip state is declared. If a trip state is not determined at 128, then the event is logged at 130.

Otherwise, at 132, the electrical switching apparatus (e.g., without limitation, contactor) is opened at 132 and the time and ground current level of the event are stored in an event log at 134.

For example, the timers are counters (not shown) that count in cycles (e.g., without limitation, 1/60 of a second). Four comparators (not shown) compare the output of the alarm time counter and the output of the run time counter. If, for example, the start state is active, the corresponding alarm or trip counter compares to see if the count is equal to or greater than its preset value. If so, it declares a corresponding alarm or trip and then logs the event by condition (e.g., without limitation, "ground fault alarm: 8.5 $A_{RMS}$ at 18:35.56 June 27, 2009").

The disclosed calibrated Rogowski coils 60 and sensor circuit 66 provide suitable linearity and simplicity. While Hall sensors can be linear, providing magnetic fields around them requires a five-point calibration due to the saturation of the magnetic steel around the Hall effect circuit. The transmitter and receiver of fiber glass phase shift sensors are relatively large and expensive, and include stress and temperature related shifts in gain.

The disclosed concept permits the calibration of a current sensor system including Rogowski coils 60 and corresponding sensor circuit 66 channels. The Rogowski coils 60 do not saturate and their gain remains constant over a very wide range unlike metal core current transformers. Furthermore, when the Rogowski coils 60 are suitably shielded, they have essentially no or minimal offset.

The disclosed concept provides for the calibration of one set of Rogowski coil phase current sensors 60, which can also advantageously be employed for ground fault detection, thereby avoiding the expense and volume of a separate ground fault sensor.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus comprising:
   a plurality of poles, each of said poles comprising:
     a conductor, and
     a Rogowski coil including an opening and an output, said conductor passing through the opening of said Rogowski coil; and
   a processor circuit comprising:
     a sensor circuit including a plurality of inputs, each of said inputs being electrically interconnected with the output of the Rogowski coil of a corresponding one of said poles, said sensor circuit further including a number of outputs having a plurality of values, each of said values corresponding to current flowing through the conductor of a corresponding one of said poles,
     a memory comprising for each of said poles, an offset value for said sensor circuit for a corresponding one of said poles, a gain correction factor for said sensor circuit for a corresponding one of said poles, and a gain correction factor for the Rogowski coil of a corresponding one of said poles,
     a number of routines, and
     a processor cooperating with said sensor circuit and said number of routines to provide for each of said poles a corrected value of the current flowing through the conductor of a corresponding one of said poles as a function of a corresponding one of said values, the offset value for said sensor circuit for the corresponding one of said poles, the gain correction factor for said sensor circuit for the corresponding one of said poles, and the gain correction factor for the Rogowski coil of the corresponding one of said poles.

2. The electrical switching apparatus of Claim 1 wherein said plurality of poles are three poles.

3. An electrical switching apparatus comprising:
a plurality of poles, each of said poles comprising:
   a conductor, and
   a Rogowski coil including an opening and an output, said conductor passing through the opening of said Rogowski coil; and
a processor circuit comprising:
   a sensor circuit including a plurality of inputs, each of said inputs being electrically interconnected with the output of the Rogowski coil of a corresponding one of said poles, said sensor circuit further including a number of outputs having a plurality of values, each of said values corresponding to current flowing through the conductor of a corresponding one of said poles,
   a memory comprising for each of said poles, an offset value for said sensor circuit for a corresponding one of said poles, a gain correction factor for said sensor circuit for a corresponding one of said poles, and a gain correction factor for the Rogowski coil of a corresponding one of said poles,
   a number of routines, and
   a processor cooperating with said sensor circuit and said number of routines to provide for each of said poles a corrected value of the current flowing through the conductor of a corresponding one of said poles as a function of a corresponding one of said values, the offset value for said sensor circuit for the corresponding one of said poles, the gain correction factor for said sensor circuit for the corresponding one of said poles, and the gain correction factor for the Rogowski coil of the corresponding one of said poles,
wherein said plurality of poles are three poles, and
wherein for each of said three poles said processor is structured to provide the current flowing through the conductor of the corresponding one of said poles from:

$N_a = N_{ma} - N_{osa}$ $K_{csa} = (K_{ADCdesign} \times K_{RCdesign}) / (K_{RCCFa} \times K_{CFa})$ $A_{amps} = N_a / K_{csa}$ wherein:
$N_{ma}$ is the value corresponding to the current flowing through the conductor of the corresponding one of said poles;
$N_{osa}$ is the offset value for the sensor circuit for the corresponding one of said poles;
$K_{ADCdesign}$ is desired gain of the sensor circuit for the corresponding one of said poles;
$K_{RCdesign}$ is desired gain of the Rogowski coil of the corresponding one of said poles;
$K_{RCCFa}$ is the gain correction factor for the Rogowski coil of the corresponding one of said poles;
$K_{CFa}$ is the gain correction factor for said sensor circuit for the corresponding one of said poles; and
$A_{amps}$ is the corrected value of the current flowing through the conductor of the corresponding one of said poles.

4. The electrical switching apparatus of claim 3 wherein said electrical switching apparatus is a motor starter.

5. The electrical switching apparatus of claim 3 wherein said electrical switching apparatus is a medium voltage electrical switching apparatus.

6. The electrical switching apparatus of claim 3 wherein said electrical switching apparatus is a motor protector.

7. A method of calibrating an electrical switching apparatus comprising for each of a plurality of poles a Rogowski coil and a corresponding sensor circuit, said Rogowski coil including a gain and a gain error, said corresponding sensor circuit including an offset, a gain and a gain error, said method comprising:
for each of said poles:
   determining the offset of the corresponding sensor circuit,
   determining the gain of the corresponding sensor circuit,
   determining a gain correction factor for the corresponding sensor circuit,
   determining the gain of said Rogowski coil by simultaneously passing the same primary current though said Rogowski coil of each of said poles as part of said electrical switching apparatus, and
   determining a gain correction factor of said Rogowski coil as a function of said determined gain of said Rogowski coil.

8. The method of claim 7 wherein said Rogowski coil further includes an offset, said method further comprising for each of said poles, determining whether the offset of said Rogowski coil is below a predetermined value.

9. A method of calibrating an electrical switching apparatus comprising for each of a plurality of poles a Rogowski coil and a corresponding sensor circuit, said Rogowski coil including an offset, a gain and a gain error, said corresponding sensor circuit including an offset, a gain and a gain error, said method comprising:
for each of said poles:
   determining the offset of the corresponding sensor circuit,
   determining the gain of the corresponding sensor circuit,
   determining a gain correction factor for the corresponding sensor circuit,
   determining the gain of said Rogowski coil by simultaneously passing the same primary current though said Rogowski coil of each of said poles as part of said electrical switching apparatus,
   determining a gain correction factor of said Rogowski coil as a function of said determined gain of said Rogowski coil, and
   determining whether the offset of said Rogowski coil is below a predetermined value, and
   further comprising as said determining whether the offset of said Rogowski coil is below a predetermined value, closing said electrical switching apparatus, applying a plural-pole line-to-line medium voltage to said electrical switching apparatus, determining whether the offset of said Rogowski coil is greater than or equal to said predetermined value, and responsively rejecting said Rogowski coil.

10. The method of claim 9 further comprising displaying at least one of: (a) the gain correction factor of said Rogowski coil with said Rogowski coil; and (b) the gain correction factor of the corresponding sensor circuit with said corresponding sensor circuit.

11. An electrical switching apparatus comprising:
a plurality of poles, each pole of said poles comprising:
   a conductor, and
   a Rogowski coil including an opening and an output, said conductor passing through the opening of said Rogowski coil; and
a processor circuit comprising:

a sensor circuit including a plurality of inputs, each of said inputs being electrically interconnected with the output of the Rogowski coil of a corresponding one of said poles, said sensor circuit further including a number of outputs having a plurality of values, each of said values corresponding to current flowing through the conductor of a corresponding one of said poles, a number of routines, and a processor cooperating with said sensor circuit and said number of routines to provide a first protection function for said poles as a function of the current flowing through the conductor of a number of said poles, and to provide a second ground fault protection function as a function of the sum of said plurality of values, wherein the Rogowski coil of each of said poles is used for both of said first protection function and said second ground fault protection function.

12. The electrical switching apparatus of claim 11 wherein said first protection function is a motor protection function; wherein said second ground fault protection function is a high resistance ground fault protection function; and wherein the Rogowski coil of each of said poles is used for both of said motor protection function and said high resistance ground fault protection function.

13. An electrical switching apparatus comprising:

a plurality of poles, each pole of said poles comprising:
a conductor, and
a Rogowski coil including an opening and an output, said conductor passing through the opening of said Rogowski coil; and a processor circuit comprising:
a sensor circuit including a plurality of inputs, each of said inputs being electrically interconnected with the output of the Rogowski coil of a corresponding one of said poles, said sensor circuit further including a number of outputs having a plurality of values, each of said values corresponding to current flowing through the conductor of a corresponding one of said poles, a number of routines, and a processor cooperating with said sensor circuit and said number of routines to provide a first protection function for said poles as a function of the current flowing through the conductor of a number of said poles, and to provide a second ground fault protection function as a function of the sum of said plurality of values, wherein the Rogowski coil of each of said poles is used for both of said first protection function and said second ground fault protection function, and wherein for each of said three poles said processor is structured to provide the current flowing through the conductor of the corresponding one of said poles from:

$$N_a = N_{ma} - N_{osa}$$

$$K_{csa} = (K_{ADCdesign} \times K_{RCdesign})/(K_{RCCFa} \times K_{CFa})$$

$$A_{amps} = N_a/K_{csa}$$

wherein $N_{ma}$ is the value corresponding to the current flowing through the conductor of the corresponding one of said poles;

$N_{osa}$ is the offset value for the sensor circuit for the corresponding one of said poles;

$K_{ADCdesign}$ is desired gain of the sensor circuit for the corresponding one of said poles;

$K_{RCdesign}$ is desired gain of the Rogowski coil of the corresponding one of said poles;

$K_{RCCFa}$ is the gain correction factor for the Rogowski coil of the corresponding one of said poles;

$K_{CFa}$ is the gain correction factor for said sensor circuit for the corresponding one of said poles; and $A_{amps}$ is a corrected value of the current flowing through the conductor of the corresponding one of said poles.

14. The electrical switching apparatus of claim 13 wherein said electrical switching apparatus is a motor starter.

15. The electrical switching apparatus of claim 13 wherein said electrical switching apparatus is a medium voltage electrical switching apparatus.

16. The electrical switching apparatus of claim 13 wherein said electrical switching apparatus is a motor protector.

17. The electrical switching apparatus of claim 13 wherein said conductor is an elongated conductor.

18. The electrical switching apparatus of claim 13 wherein said plurality of poles are three poles.

19. The electrical switching apparatus of claim 13 wherein the second ground fault protection function is further structured to repetitively sum, for said three poles, the corrected value of the current flowing through the conductor of the corresponding one of said poles for said three poles to determine ground current, to compare said ground current to a predetermined value, and to generate an alarm condition or a trip condition if said ground current exceeds said predetermined value.

20. The electrical switching apparatus of claim 13 wherein said first protection function is a motor protection function; wherein said second ground fault protection function is a high resistance ground fault protection function; and wherein the Rogowski coil of each of said poles is used for both of said motor protection function and said high resistance ground fault protection function.

* * * * *